United States Patent [19]
Yao

[11] Patent Number: 4,887,225
[45] Date of Patent: Dec. 12, 1989

[54] METHOD AND DEVICE FOR CONTROLLING EXPOSURE BEAMS

[75] Inventor: Koji Yao, Osaka, Japan

[73] Assignee: Danippon Screen Mfg. Co., Ltd., Japan

[21] Appl. No.: 861,721

[22] Filed: May 12, 1986

[30] Foreign Application Priority Data

May 24, 1985 [JP] Japan .................................. 60-112358
Jun. 11, 1985 [JP] Japan .................................. 60-127358

[51] Int. Cl.⁴ .............................................. G06K 1/20
[52] U.S. Cl. ..................................... 364/518; 358/75; 346/108
[58] Field of Search ................... 364/518, 523; 358/75, 358/285, 289, 296, 302, 298; 354/4; 346/108

[56] References Cited

U.S. PATENT DOCUMENTS

| | | | |
|---|---|---|---|
| 3,572,925 | 3/1971 | Ables et al. | 364/523 X |
| 3,983,319 | 9/1976 | Moe et al. | 358/75 X |
| 4,104,566 | 8/1978 | Shah | 364/523 X |
| 4,386,272 | 5/1983 | Check, Jr. et al. | 358/298 X |
| 4,393,387 | 7/1983 | Kitamura | 346/108 |
| 4,419,690 | 12/1983 | Hammes | 358/75 |
| 4,500,182 | 2/1985 | Schumann | 354/4 |
| 4,620,288 | 10/1986 | Welmers | 364/518 |
| 4,630,223 | 12/1986 | Schoon | 364/523 X |
| 4,651,287 | 3/1987 | Tsao | 364/518 X |
| 4,661,918 | 4/1987 | Buschmann et al. | 364/523 X |

Primary Examiner—E. S. Kemeny
Assistant Examiner—Mark K. Zimmerman
Attorney, Agent, or Firm—Lowe, Price, LeBlanc, Becker & Shur

[57] ABSTRACT

A D-A converter outputs feed pitch error signals on an exposure head. The error signals are inverted to be supplied to a multiplier, and non-inverted to be supplied to a second multiplier. The exposure head radiates multiple beams, and ON/OFF dot signal for odd channels thereof are supplied to the multiplier and ON/OFF dot signals for even channels are supplied to the second multiplier respectively. The multipliers multiply the supplied signals, whereby values of the ON/OFF dot signals are changed in response to the errors. Thus, the beams outputted from the respective channels are controlled in power intensity, whereby diameters of printing spots on photosensitive material are changed per channel.

10 Claims, 17 Drawing Sheets (1) START PULSE
(2) ENCODER CLOCK
(3) M1 $\overline{R/W}$
(4) M2 $\overline{R/W}$
(5) M3 $\overline{R/W}$
(6) M4 $\overline{R/W}$

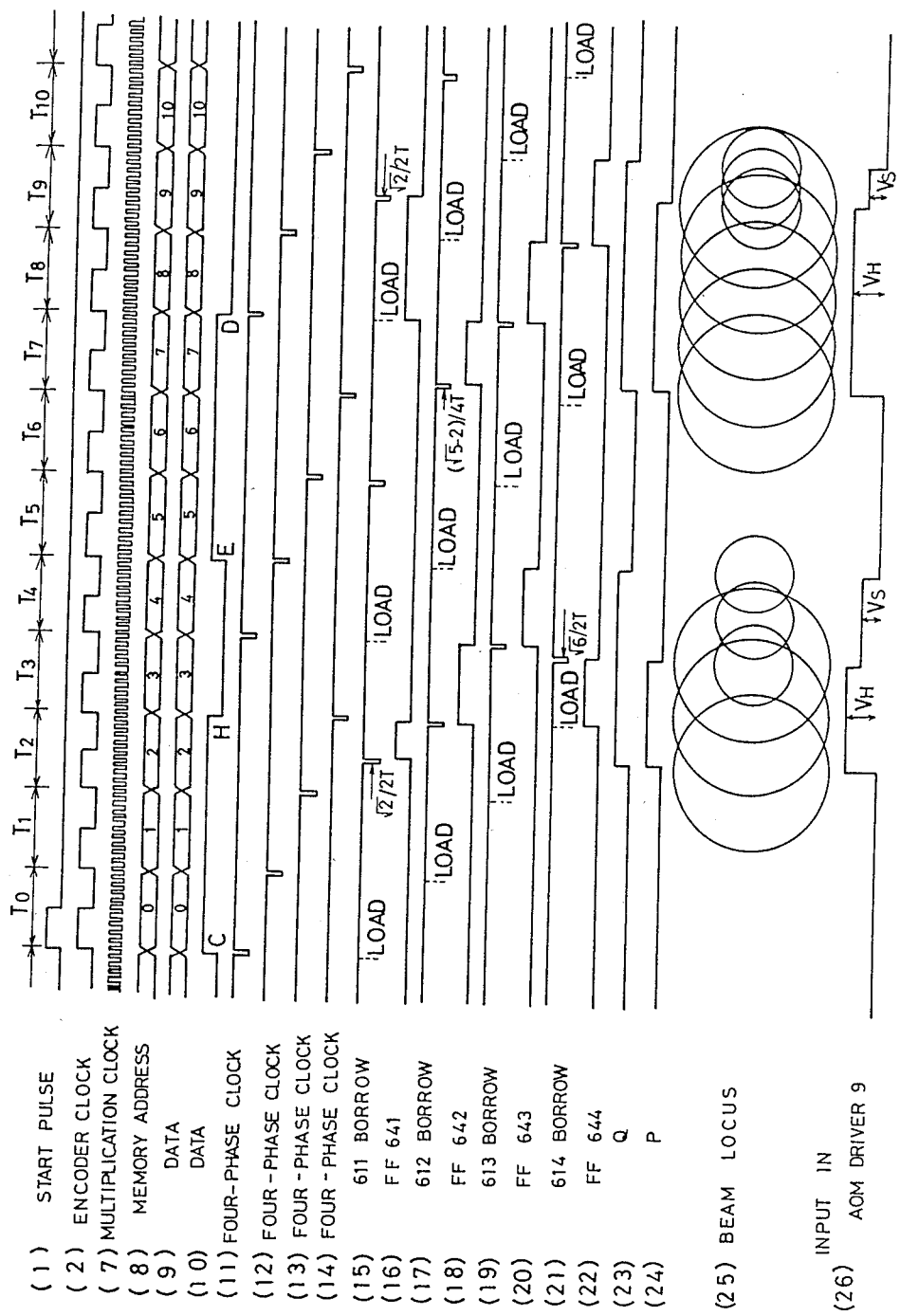

45° ON

63° ON

METHOD AND DEVICE FOR CONTROLLING EXPOSURE BEAMS

BACKGROUND OF THE INVENTION

1. Field of the Invention

The present invention relates to an exposure/recording apparatus such as a raster plotter employed for defining wiring patterns of, e.g., PWBs (printed wiring boards) or a precise exposure apparatus for photomechanical process, which apparatus on-off controls exposure beams along supplied dot pattern data to perform main scanning and vertical scanning thereby to print desired patterns on photosensitive material, and more particularly, it relates to a method of and a device for controlling the exposure beams for correcting unevenness in recording on the photosensitive material caused in such an apparatus.

2. Description of the Prior Art

In order to print, for example, PWB wiring patterns as shown in FIG. 1 on photosensitive material, an exposure head is generally moved along the patterns of land-→wiring portion→land while the land patterns are flash-exposed through slits of prescribed shapes with wiring portion patterns being continuously exposed through slits of prescribed shapes, or only the land patterns are entirely flash-exposed through slits of prescribed shapes in advance, whereafter wiring portion patterns between the respective lands are continuously exposed through slits of prescribed shapes thereby to obtain desired patterns in the so-called vector drafting system utilizing an automatic drafting machine. As will be appreciated by one of ordinary skill in the art, the term "land" means a part of a conductor pattern which is used for connection to electrical components. Such parts are generally circular, as shown in FIG. 1 hereof. The difference between the methods of forming the patterns depends on difference in data inputted in the automatic drafting machine. According to such systems, the patterns can be smoothly printed in boundaries without unevenness, whereas considerable time is required for the printing process.

Additionally, there is provided a plane or drum scanning system called a raster scanning system, which utilizes, e.g., a raster plotter in order to enable high-speed processing. In order to accurately record images in the raster plotter, it is necessary to flash-expose respective ones of fine pixels equally pitched in both of the main and vertical scanning directions by exposure beams without causing pitch unevenness, and various methods have been proposed to improve pitch accuracy in the main and vertical scanning directions. For example, a conventional method of improving the pitch accuracy in the vertical scanning direction has generally been carried out to improve mechanical accuracy of an exposure head feeding mechanism while improving a driver, or the like, of a feed motor in accoracy and tracking, thereby to reduce absolute feed errors. However, such improvement in accuracy and efficiency of the feeding mechanism is restricted as a matter of course. Another method has been generally carried out to detect feed pitches thereby to control a servo system. However, tracking errors are caused in such a method by delay in a mechanical system.

For such reasons, slight unevenness is inevitably caused in feed pitches in the vertical scanning direction leading to irregular beam intervals, whereby printing spots along the main scanning direction meander on photosensitive material. As a result, recorded printing areas are not constant in width. Particularly in a multi-beam simultaneous exposure system, it is necessary to expose fine spots obtained by dividing a vertical scanning feed pitch by the number of beams while dense images are required in most of the case, and hence printing pitch errors caused by errors in the vertical scanning feed pitches cannot be allowed in comparison with other case. When figures for PWBs are exposed/recorded on a film, recording line width cannot be obtained in intended thickness by such uneven pitches, whereby a large number of PWBs are determined as defective by inspection after manufacturing. It is desirable that the recorded printing areas are obtained in intended thickness, in order to reduce such defectiveness.

In the prior art raster scanning system, further, pattern boundaries intersecting with the main scanning direction cannot be smoothly printed. In general, a scanning/exposure light source of a raster plotter or the like is used for a flash control system for fine circular spots having light intensity distribution approximate to a Gauss distribution and hence, in the pattern boundaries intersecting with the main scanning direction, a number of cavities slightly smaller than the radius of the printing spots are caused every line pitch of the exposure beams as shown in FIG. 2. When the exposure beams are sharply focused and the gamma characteristic of the photosensitive material is in high contrast, exposure is substantially performed as shown in FIG. 2. Simultaneously required in PWB patterns are correctness and smoothness particularly in line widths of vertical and horizontal lines, and hence such unevenness in the boundaries as shown in FIG. 2 cannot be allowed.

SUMMARY OF THE INVENTION

The present invention is directed to a method of and a device for controlling exposure beams which are on-off controlled according to supplied image data for performing main scanning, and vertical scanning thereby to print and record desired images on photosensitive material.

According to the present invention, feed pitch errors of the exposure beams in the vertical scanning direction are detected to eliminate unevenness in image boundaries along the main scanning direction for changing diameters of printing spots defined by the exposure beams on photosensitive material on the basis of the detected feed pitch errors, thereby to correctly orient end portions of the printing spots along the main scanning direction.

According to the present invention, tilt angles of image boundaries intersecting with the main scanning direction are detected from supplied image data to eliminate unevenness in the image boundaries intersecting with the main scanning direction, thereby to control the exposure beams so as to increase the diameters of the printing spots defined by the exposure beams on the photosensitive material at least in the said boundaries on the basis of the detected tilt angles.

Accordingly, a principal object of the present invention is to provide a method of and a device for controlling exposure beams which can smooth all of pattern boundaries of desired image patterns with no unevenness thereby to print the same on photosensitive material in exposure/recording of the so-called raster scanning system.

Another object of the present invention is to provide a method of and a device for controlling exposure beams which can improve manufacturing accuracy of printed wiring boards.

These and other objects, features, aspects and advantages of the present invention will become more apparent from the following detailed description of the present invention when taken in conjunction with the accompanying drawings.

BRIEF DESCRIPTION OF THE DRAWINGS

FIG. 21 is a timing chart showing operations in FIG. 20;

DETAILED DESCRIPTION OF THE PREFERRED EMBODIMENTS

Figure 3:
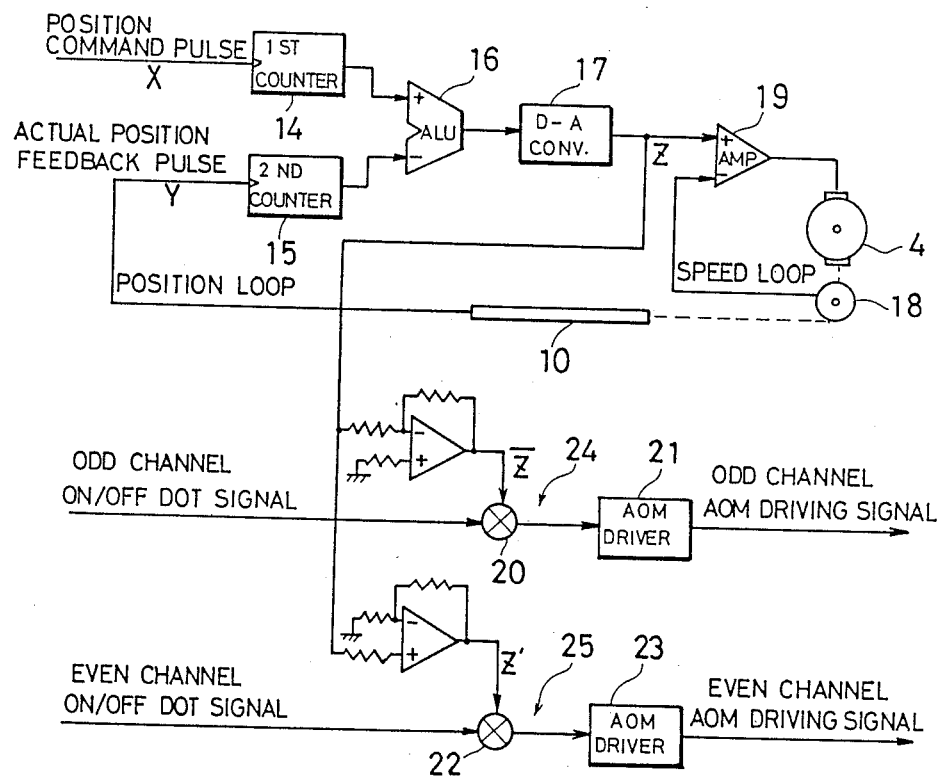
FIGS. 3 and 9 are block diagrams showing a first embodiment of the present invention.

FIG. 3 is a block diagram showing a first embodiment of a device for carrying out exposure beam control according to the present invention. The exposure beam control device according to the first embodiment is applied to, e.g., a rotary drum type raster plotter as shown in FIG. 4, to correct feed pitch errors in the vertical scanning direction.

Figure 4:
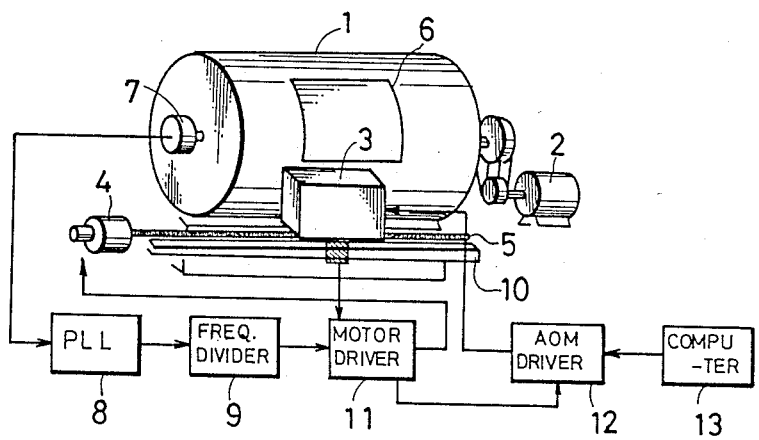
FIG. 4 is a schematic diagram showing the mechanism of a rotary drum type raster plotter to which the present invention is applied.

Referring to FIG. 4, a rotary drum 1 is driven by a main scanning motor 2 and an exposure head 3 is fed in the vertical scanning direction by a feeding mechanism which is formed by a vertical scanning motor 4 and a feed screw 5. When the main scnning motor 2 is formed by a synchronous motor, the number of rotations of the drum 1 is changed in proportion to frequency changes of a power supply, whereby images printed on a film 6 are contracted/expanded in the vertical scanning direction to cause absolute size errors if the vertical scanning motor 4 is rotated at a constant speed. Therefore, output pulses from a rotary encoder 7, which is mounted on the rotary drum 1, are passed through a PLL (phase locked loop) circuit 8 and a frequency divider 9 to produce vertical scanning position command pulses X, to drive the vertical scanning motor 4 by a motor driver 11 through comparison of the vertical scanning position command pulses X and actual position feedback pulses Y from a linear scale 10 indicating actual vertical scanning positions, thereby to synchronise the speed of rotation in the main scanning direction with the feed speed in the vertical scanning direction. The exposure head 3 is formed as, e.g., a 10-channel multi-beam system head, and is adapted to perform on-off control of dots for ten channels which are arrayed in the vertical scanning direction in response to driving signals from an AOM (acoustic optical modulator) driver 12 as well as power control per channel. The AOM driver 12 receives error signals Z (hereinafter described) from the motor driver 11 and ON/OFF dot signals D from a computer 13 for image processing, to produce signals for controlling an AOM in the exposure head 3.

Referring to FIG. 3, a first counter 14 counts the position command pulses X from the frequency divider 9 as shown in FIG. 4 and a second counter 15 counts the actual position feedback pulses Y from the linear scale 10. An arithmetic and logical unit (ALU) 16 receives the contents of the first and second counters 14 and 15 to subtract the count values of the second counter 15 from those of the first counter 14 and supply the results to a D-A converter 17.

Output values of the D-A converter 17 indicate errors in actual vertical scanning positions with respect to the vertical scanning position commands, and the error signals Z and output signals from a tachogenerator 18 for detecting the speed of rotation of the vertical scanning motor 4 are inputted in a differential amplifier 19, the outputs of which are adapted to control the number of rotations of the vertical scanning motor 4. A speed loop is thus formed, whereby the vertical scanning motor 4 is so rotated as to cause no error.

The output of the D-A converter 17 is most preferably constant, whereas, in practice, voltage including minute changes corresponding to the constant value+several bits is output from the D-A converter 17 due to pitch errors in the screw 5 and changes in feeding loads. Although the width of such voltage changes can be reduced to some extent by increasing the gain of the speed loop and that of a position loop including the linear scale 10 and the ALU 16 as much as possible within limit of stability of the systems, it cannot be zeroed. Thus, the beams cannot be maintained at regular intervals and printing areas of recorded images, particularly those which are parallel to or approximately parallel to the main scanning direction, are irregular in width.

In order to avoid this, the output signals (error signals Z) from the D-A converter 17 are employed to correct the ON/OFF dot signals D for the first to tenth channels from the computer 13 as shown in FIG. 4, in the following manner: A multiplier 20 obtains the products of odd channel ON/OFF dot signals $D_{ODD}$ and inverted signals $\bar{Z}$ of the error signals Z, to supply the multiplied outputs to an AOM driver 21 for each odd channel. A multiplier 22 obtains the products of even channer ON/OFF dot signos $D_{EVEN}$ and non-inverted signals Z' of the error signals Z, to supply the multiplied outputs to an AOM driver 23 for each even channel. In response to the signals thus inputted, the respective AOM drivers 21 and 23 produce signals for driving AOMs (not shown) in the exposure head 3 in FIG. 4. In response to the driving signals, output beams from the respective channels are controlled in power intensity, whereby diameters of printing spots on the film 6 are changed per channel.

It is to be noted that odd and even channel lines 24 and 25 are respectively shown in a general manner in FIG. 3, and in practice, provided are five channel lines 24 for the first, third, fifth, seventh and ninth channels and five even channel lines for the second, fourth, sixth, eighth and tenth channels.

Figure 5:
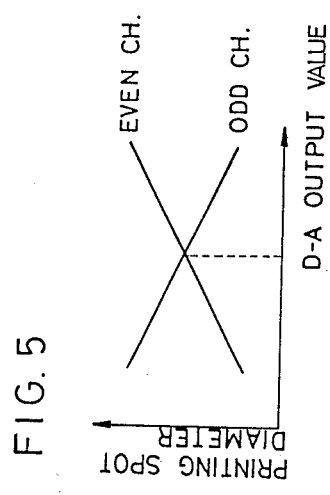
FIGS. 5 and 10 are explanatory diagrams showing changes in printing spot diameters in the first embodiment.

FIG. 5 is an explanatory diagram showing the manner of changes in printing spot diameters obtained by the aforementioned correction with respect to the output values of the D-A converter 17. In the odd channels, the printing spot diameters are reduced as the output values of the D-A converter 17 are increased, while the printing spot diameters in the even channels are increased as the output values of the D-A converter 17 are increased. There is no positional error in the intersection point of the two straight lines, and the printing spots efficiently overlap each other. It is important to make adjacent printing spots overlap each other, so that no clearance is defined in the output images.

Figure 6:
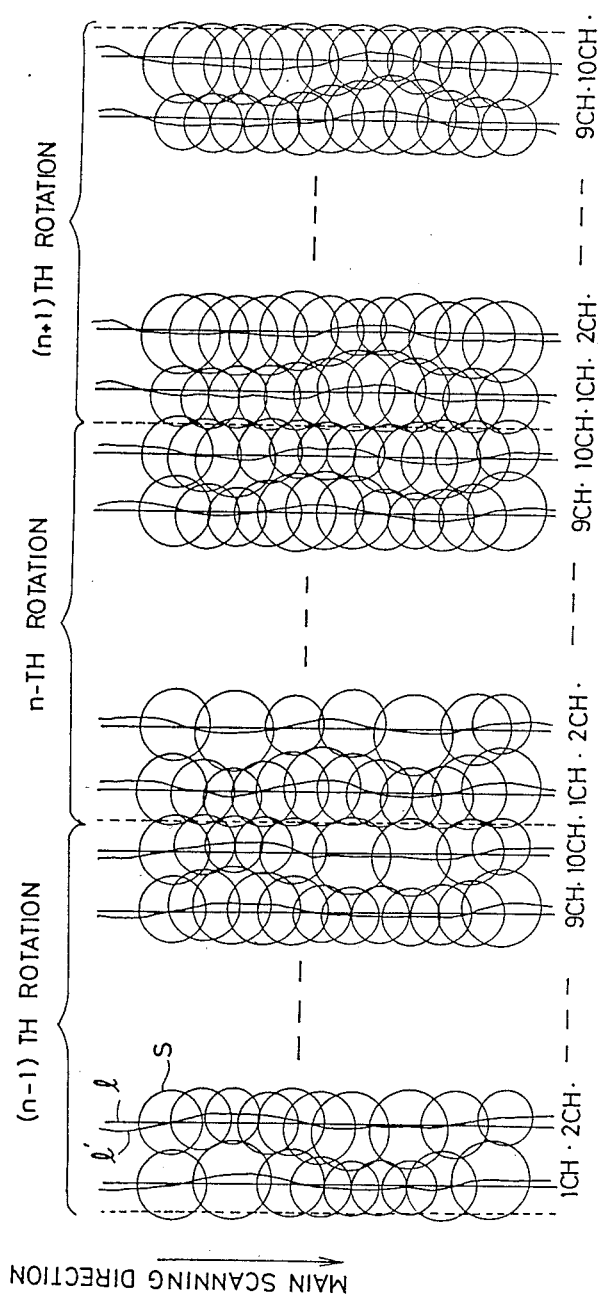
FIGS. 6 and 11 are explanatory diagrams showing the manners of connection between printing areas in the vertical scanning direction in the first embodiment.
Figure 7:
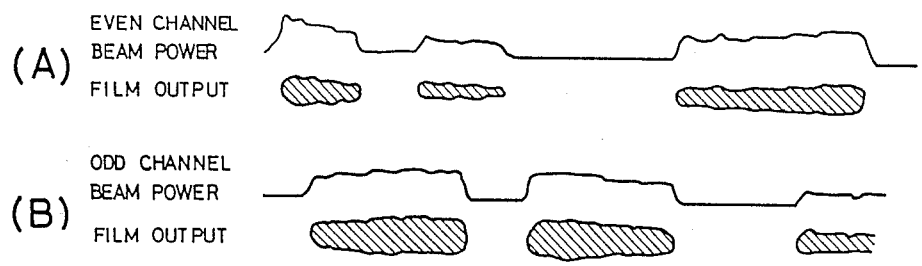
FIGS. 7 and 12 are explanatory diagrams showing film image outputs of respective channels.

FIG. 6 shows the manner of connection between images in the vertical scanning direction, which are corrected in the aforementioned manner. FIG. 6 illustrates loci of the beams from (n−1)th to (n+1)th rotations in a case where all of the ON/OFF dot signals for the first to tenth channels are ON, and respective printing spots S are continuously changed in diameter along the relation as shown in FIG. 5 with scanning on actual trace loci l' finely vibrating about correct loci l, i.e., including errors. It may be easily understood that no clearance is defined in connecting portions (shown by dotted lines) of respective scanning operations and the edges of the printing spots S are substantially linearly oriented in the main scanning direction. Further, the odd channels and the even channels are reverse to each other in relation to increase/decrease of the spot diameters with respect to the errors, whereby no clearance is defined in the beams between the respective ones of the first to tenth channels. FIG. 7 shows examples of the changes in the dot diameters of the images thus obtained. At (A) and (B) in FIG. 7 are shown, in an exaggerated scale, changes in power of the beams of the even and odd channels and changes in image outputs on the film at that time.

Figure 8:
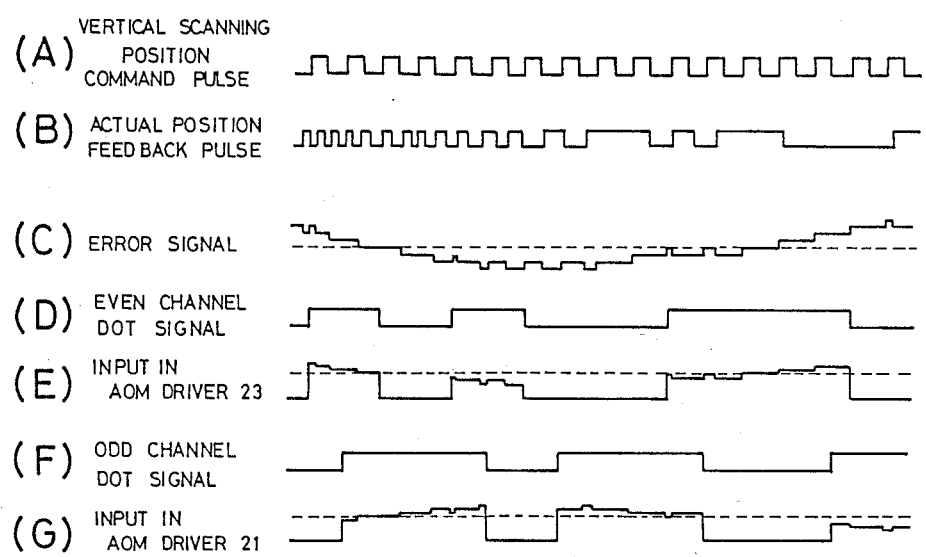
FIGS. 8 and 13 are timing charts showing signals in respective parts in FIGS. 3 and 9 respectively.

FIG. 8 is a timing chart showing the signals in the respective parts as shown in FIG. 3. Output signals (error signals) of the D-A converter 17 as shown at (C) are obtained by vertical position command pulses as shown at (A) and actual position feedback pulses as shown at (B). Assuming that ON/OFF dot signals for the even channels are as shown at (D) and ON/OFF dot signals for the odd channels are as shown at (F), signals inputted in the even channel AOM driver 23 are corrected as shown at (E) and those inputted in the odd channel AOM driver 21 are corrected as shown at (G). When the printing spots are in an odd number, one of the odd printing spots is subjected to control similar to that for the even spots so that the printing spots on both ends are controlled in reverse relation.

Figure 9:
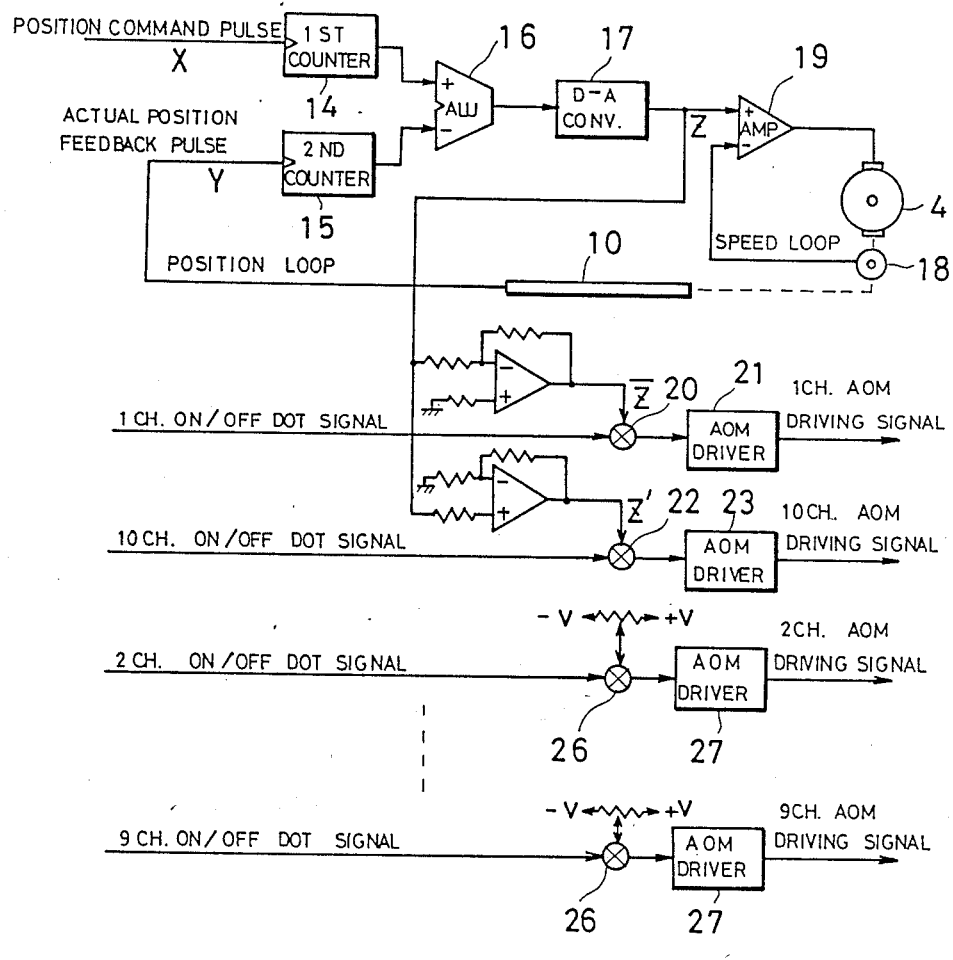

Although all of the channels are corrected in the aforementioned embodiment as shown in FIG. 4, only the first and tenth channels (printing spots on both ends) may be corrected as shown in FIG. 9 when the ratio of printing area width per scanning line to that calculated by the computer to be printed is in integral relation, whereby no clearance is defined between the beams and linearity in the main scanning direction is maintained. In such a case, a multiplier 26 multiplies the respective ON/OFF dot signals for the second to ninth channels by fixed values and the beam power thereof is maintained constant.

Figure 10:
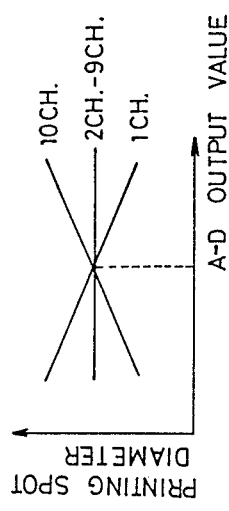
Figure 11:
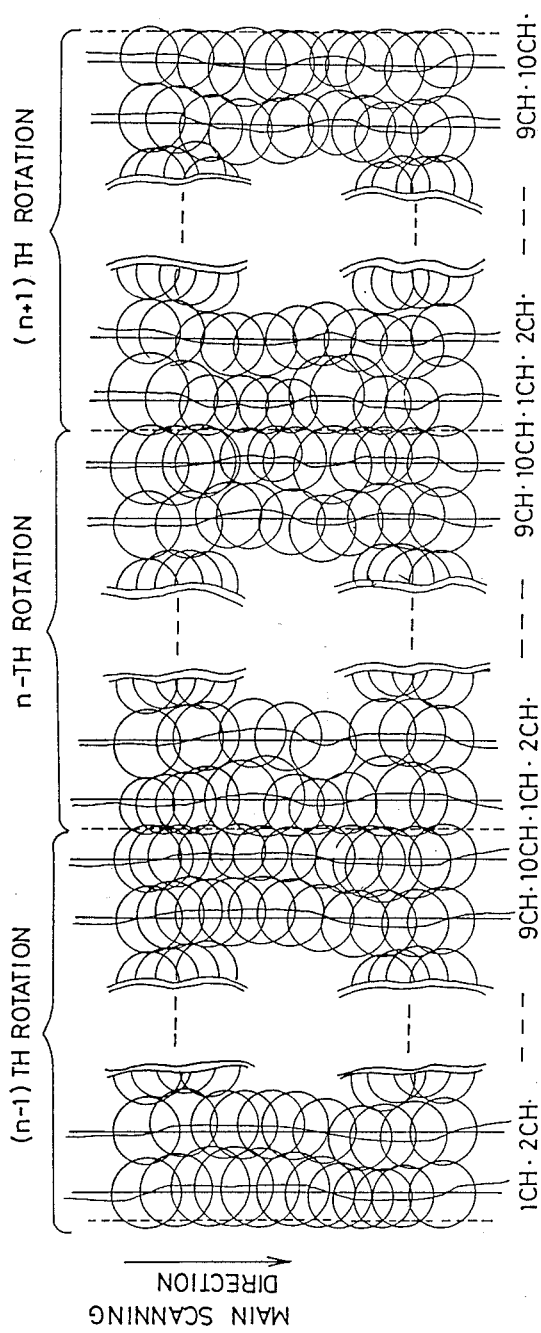

FIG. 10 is an explanatory diagram showing changes in the printing spot diameters with respect to the output values of the D-A converter 17 in the above case, and FIG. 11 shows beam loci of (n−1)th to (n+1)th rotations. Although the printing spot diameters of the second to ninth channels are not changed dissimilarly to the case of FIG. 6, no clearance is defined between the first and second channels and between the ninth and tenth channels as well as between adjacent ones of the second to ninth channels since no significant positional error is caused between the said adjacent channels. The edges of the printing spots are orderly oriented in connecting portions of respective scanning operations as shown by dotted lines, similarly to the case of FIG. 6.

Figure 12:
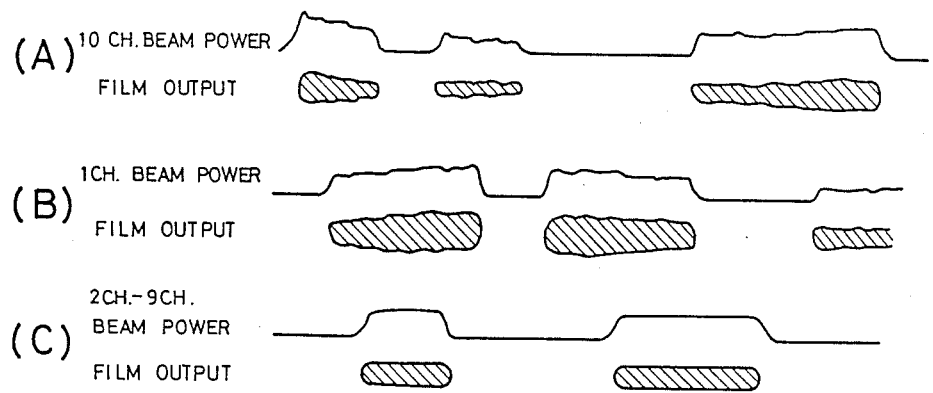
Figure 13:
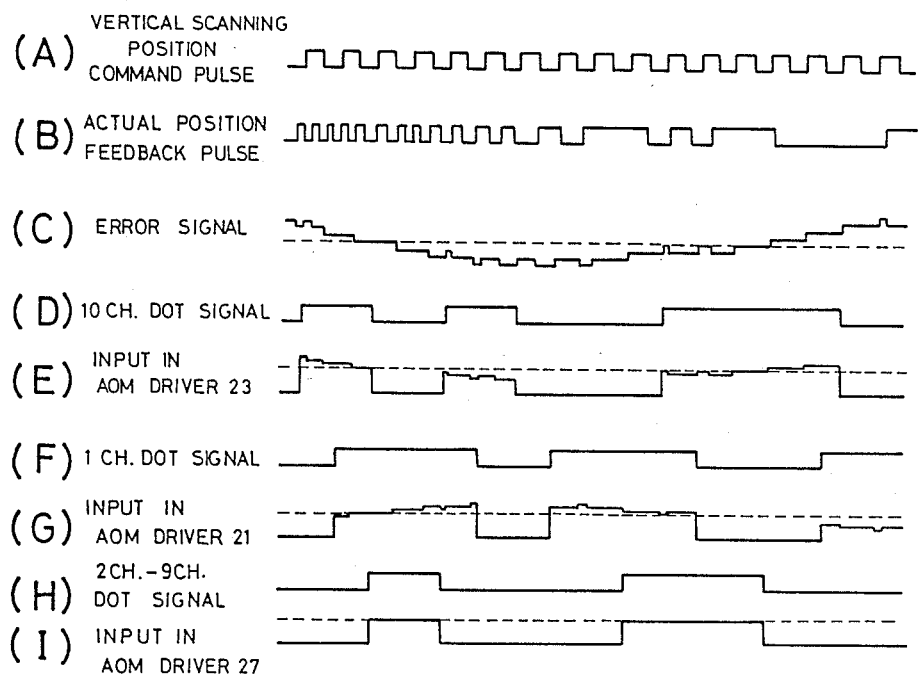

FIG. 12 shows examples of changes in dot diameters of images thus obtained, and symbols (A), (B) and (C) denote changes in beam power of the tenth, first and second to ninth channels and changes in images outputs on the film at that time respectively. The dot diameters of the output images are not changed in the second to ninth channels. FIG. 13 is a timing chart showing signals of the respective parts in FIG. 9. Dissimilarly to the case of FIG. 8, ON/OFF dot signals (H) for the second to ninth channels are merely multiplied by fixed values by the multiplier 26, i.e., not corrected, to be supplied as input signals (I) for respective AOM drivers 27 for the second to ninth channels.

Although the above embodiment has been described in detail with respect to the case where the vertical scanning feed is continuous, the present invention can also be applied to such case where the vertical scanning is stepwisely fed per scanning line.

According to the first embodiment of the present invention as hereinabove described, the feed pitch errors of the optical beams in the vertical scanning direction are detected to control the printing spot diameters on the basis of the detected errors, whereby no clearance is defined between the printing spots even if the feed pitches are uneven in the vertical scanning direction and the ends of the printing spots are substantially linearly oriented in the main scanning direction while a constant printing area width is obtained. The printing area width is controlled to be in a constant value in manufacturing of PWBs so that manufacturing accuracy of the PWBs is improved.

Description is now made of a second embodiment of the present invention for smoothly printing image boundaries intersecting with the main scanning direction. Although the following description is made as to the case of printing PWB patterns, the present invention can also be applied to a precise exposure apparatus for a photomechanical process.

Figure 14:
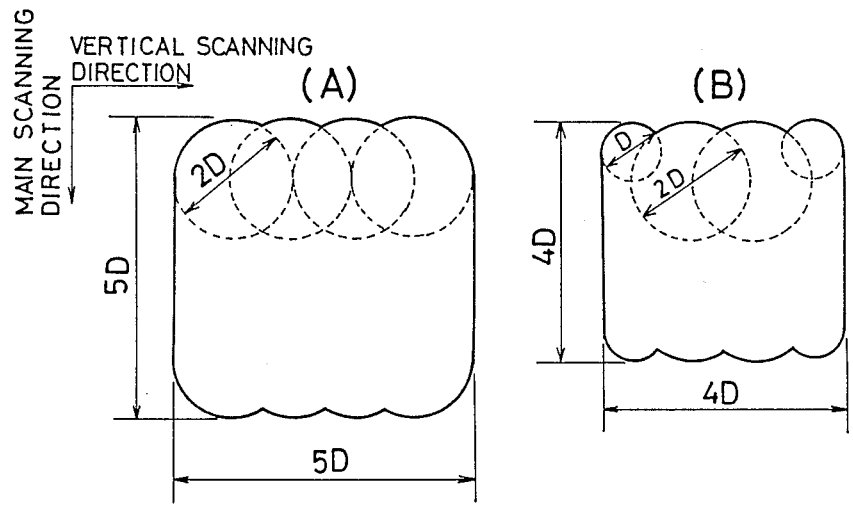
FIG. 14 is an explanatory diagram showing control of printing spot diameters by the present invention.

As shown in FIG. 14(A), printing spot diameters defined by exposure beams are increased in pattern boundaries intersecting with the main scanning direction thereby to obtain relatively smooth boundaries in the second embodiment. In order to print thin patterns in high density with smoothness in boundaries of the patterns intersecting with the main scanning direction, preferably the spot diameters are controlled only with respect to the printing spots other than those on both ends of the patterns in the main scanning direction, as shown at FIG. 14(B). Although the spots other than those on both ends are increased in diameter in upper and lower ends at (A) and (B) in FIG. 14, those in the intermediate portions may or may not be increased in diameter.

Figure 1:
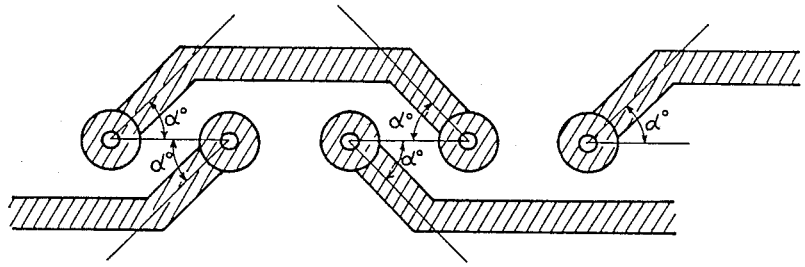
FIG. 1 is an explanatory diagram of PWB wiring patterns.
Figure 2:
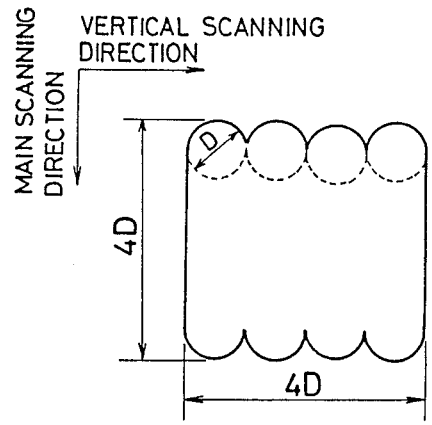
FIG. 2 is an explanatory diagram illustrating printing by a conventional raster scanning system.
Figure 15:
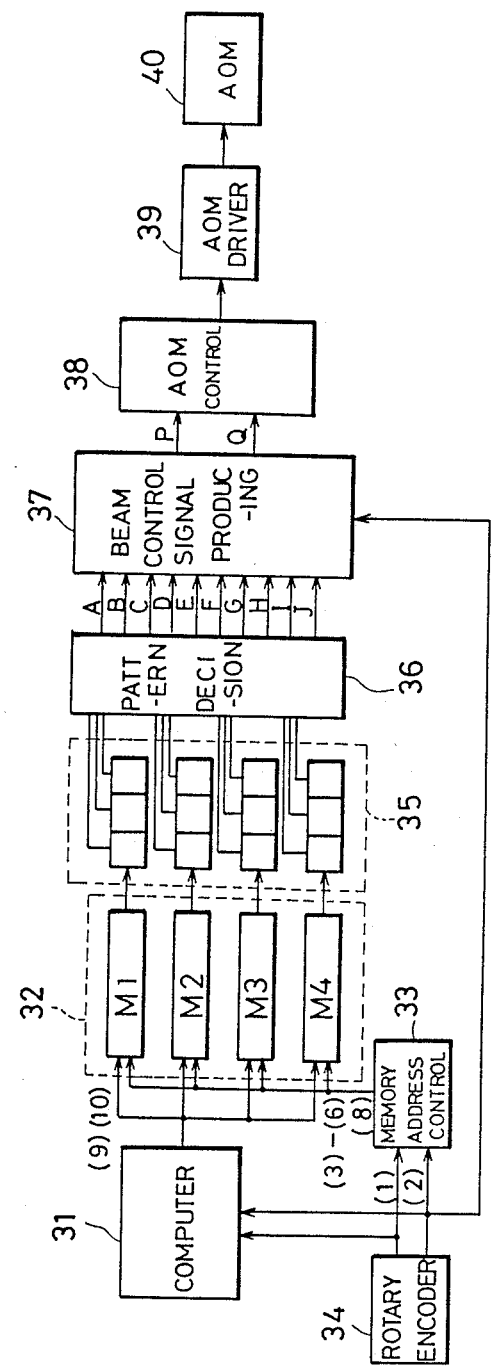
FIG. 15 is a block diagram showing a record embodiment of the present invention.

FIG. 15 is a block diagram showing the circuit configuration of a drum type raster plotter to which exposure beam control according to the second embodiment is applied. A computer 31 is connected with a magnetic storage (not shown) which stores data (a plurality of vector data) for connecting, e.g., the coordinates as shown in FIG. 1 through appropriate paths, so that the computer 31 fetches the data to convert the same by a well-known method to data as to which timings of n-th rasters (scanning lines) are ON or OFF, thereby to output the data along the sequence of scanning.

A line memory unit 32 has capacity for four scanning lines, and the raster data outputted from the computer 31 are sequentially written in line memories $M_1$ to $M_4$ line by line in a cyclic manner, under control of a memory address control part 33.

Figure 16:
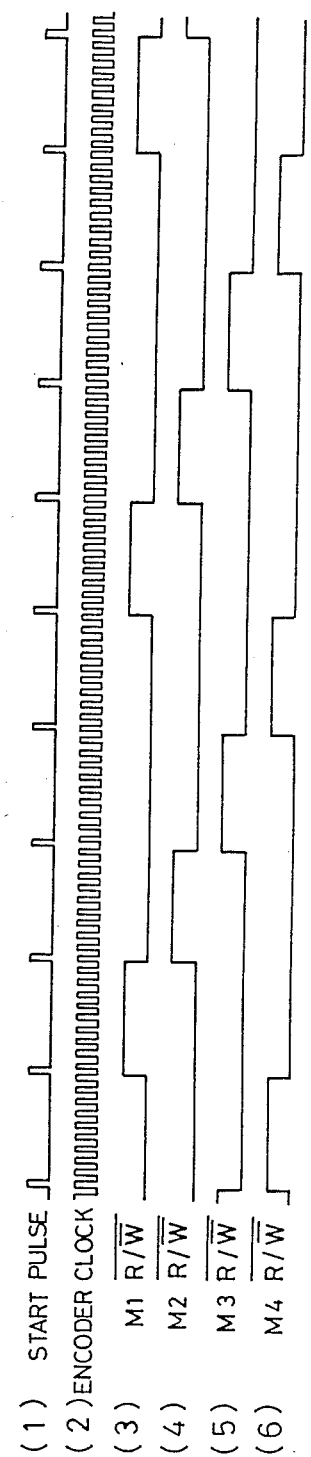
FIG. 16 is a timing chart showing the operation of FIG. 15.
Figure 17:
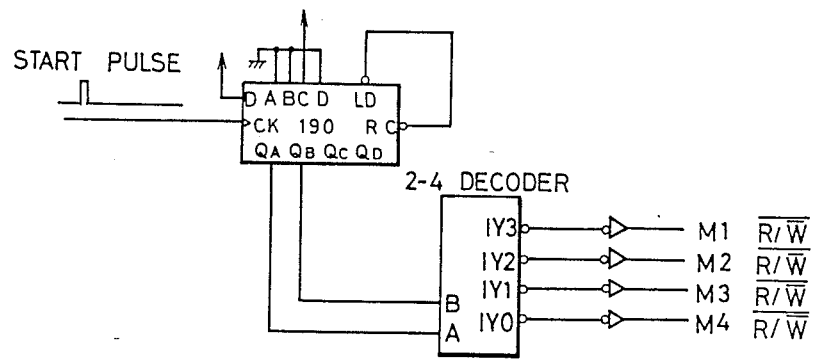
FIG. 17 is a circuit diagram showing an example of a circuit for producing read/write control signals.

The memory address control part 33 receives start pulses (pulse/rotation) (1) and encoder clocks (2) as shown in FIG. 16 from a rotary encoder 34 mounted on a rotary drum of, e.g., a drum type raster plotter (not shown), to produce read/write control signals $\overline{R/W}$ as shown at (3) to (6) for directing writing at high levels and reading at low levels and memory address control signals (8) as shown in FIG. 21, thereby to supply the same to the respective line memories $M_1$ to $M_4$. FIG. 17 shows an example of a circuit configuration for producing the read/write control signals $\overline{R/W}$ through a 2-4 decoder.

As obvious from the timings as shown at (3) to (6) in FIG. 16, when any one of the line memories $M_1$ to $M_4$ is writing of data for one line, the other three line memories are in reading states. Such reading and writing of the data are performed in synchronization with the encoder clock signals (2) as shown in FIG. 16.

A shift register 35 includes four serial registers, which are in one-for-one connection with the line memories $M_1$ to $M_4$ to temporarily store the data read from the corresponding line memories sequentially by three pixels. Thus, the shift register 35 temporarily stores the data of 3×3 pixel regions in order.

Figure 18:
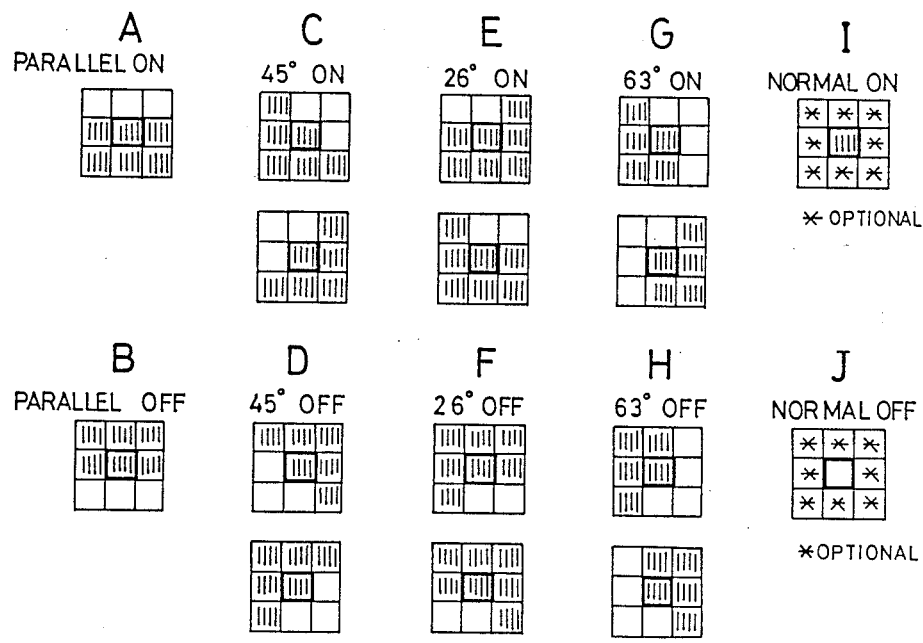
FIG. 18 is an explanatory diagram showing decision patterns.

A pattern decision circuit 36 decides whether or not exposure pattern boundaries intersecting with the main scanning direction have specific tilt angles on the basis of the data in the aforementioned 3×3 pixel regions. Ten tilt angles can be decided in the 3×3 pixel regions as shown in FIG. 18, while it is necessary to increase the number of pixels to be decided thereby to arbitrarily expand the same to m×n (m, n>3) regions in order to detect more angles. However, the tilt angles of the boundaries of the PWB patterns are limited to a prescribed number of types, and it is not necessary to detect a larger number of angles. The number of pixels for such decision may be increased or decreased in compliance with the tilt angles as detected.

Referring to FIG. 18, the central pixels of the 3×3 pixel regions, as shown by thick lines are those to be outputted, and the printing spot diameters defined by the exposure beams and the output timings thereof are controlled in response to the detected tilt angles for outputting the pixels. A normal ON pattern indicates that the operation is under exposure and a normal OFF pattern indicates that the operation is not under exposure. ON patterns other than the normal one indicate detection of positions to start exposure and OFF patterns other than the normal one indicate detection of positions to terminate exposure.

Figure 19A:
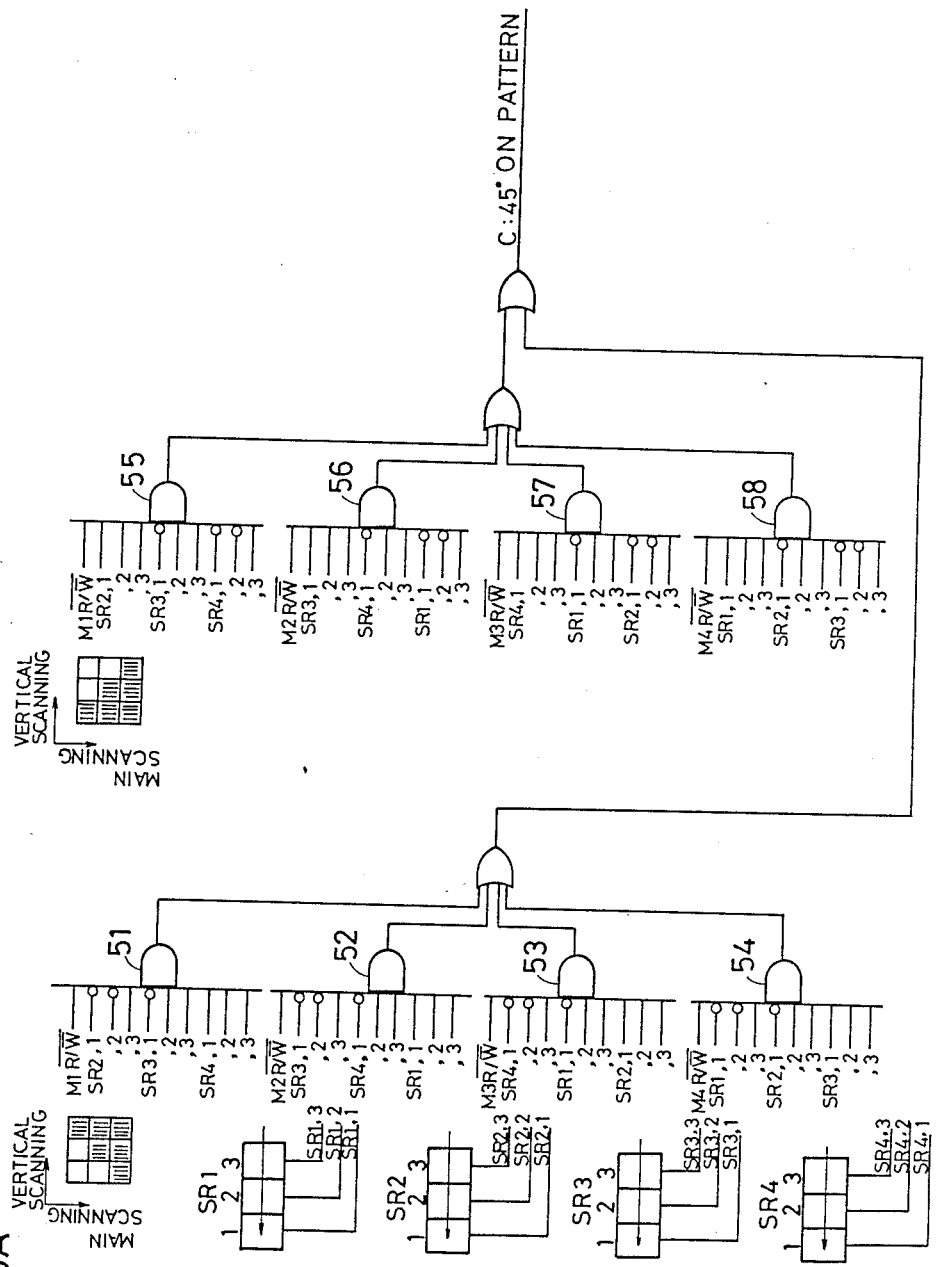
FIGS. 19A and 19B are circuit diagrams showing examples of pattern decision circuits utilizing gates.
Figure 19B:
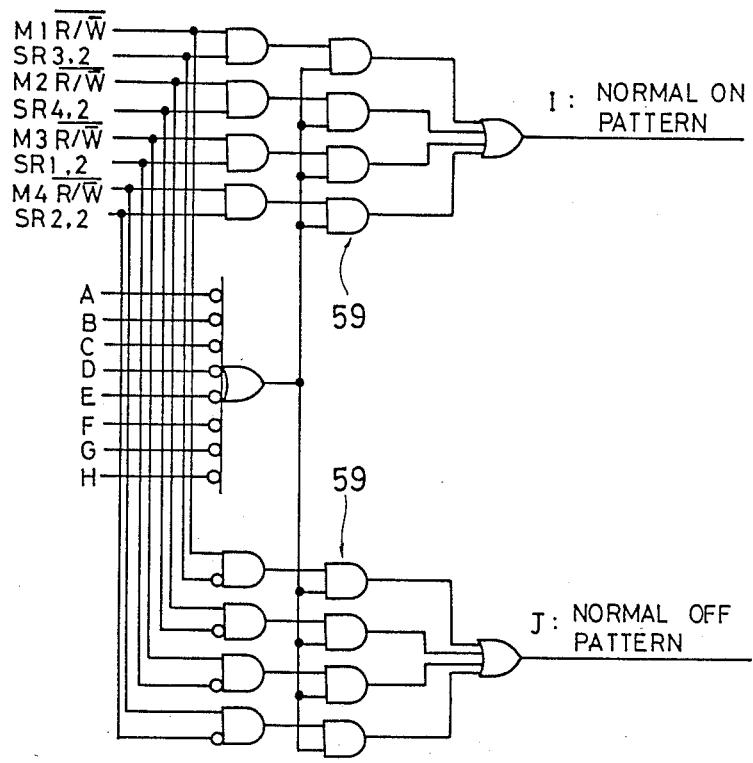

FIGS. 19A and 19B are circuit diagrams showing decision circuits for, e.g., 45° ON patterns and normal ON and OFF patterns formed through gates, and other decision circuits are similarly formed. In a 45° ON pattern decision circuit as shown in FIG. 19A, AND gates 51 to 54 are adapted to detect right-upward 45° ON patterns and AND gates 55 to 58 are adapted to detect right-downward 45° ON patterns. In case of detecting, e.g., the right-upward 45° ON patterns, one of the AND gates 51 to 54 is turned to a high level in response to high-level read/write control signals $\overline{R/W}$, to output 45° ON pattern detecting signals C when the 3×3 pixel data from three shift registers (three in SR1 to SR4) connected to the said AND gate match with the right-upward 45° ON patterns. In order to give priority to pattern deciding outputs A to H other than to normal ones, a normal ON/OFF pattern decision circuit as shown in FIG. 19B turns an AND gate group 59 to a low level when there are the pattern deciding outputs A to H, so that decision signals I and J for the normal ON/OFF patterns are not outputted.

A beam control signal producing part 37 produces printing spot diameter control signals P and beam ON/OFF control signals Q in response to the pattern deciding signals A to J from the pattern decision circuit 36. In response to the contents of the said control signals P and Q, an AOM (acoustic optical modulator) 40 is driven by an AOM control part 38 and an AOM driver 39 as hereinafter described, thereby to control the printing spot diameters defined by the exposure beams and the exposure timings thereof in correspondence to the detected tilt angles of the pattern boundaries.

Figure 20A:
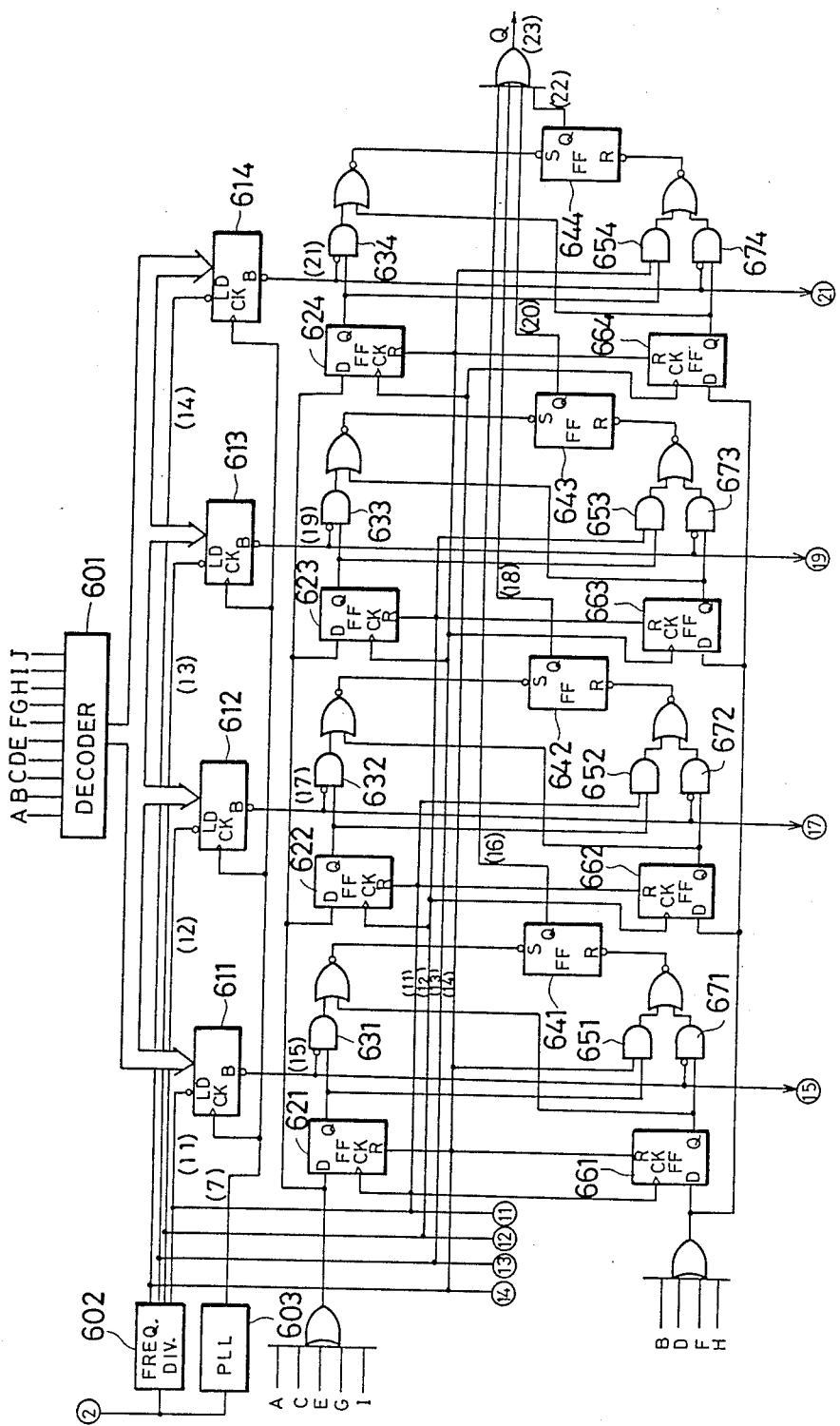
FIG. 20 is a circuit diagram showing a example of a beam control signal producing part.
Figure 20B:
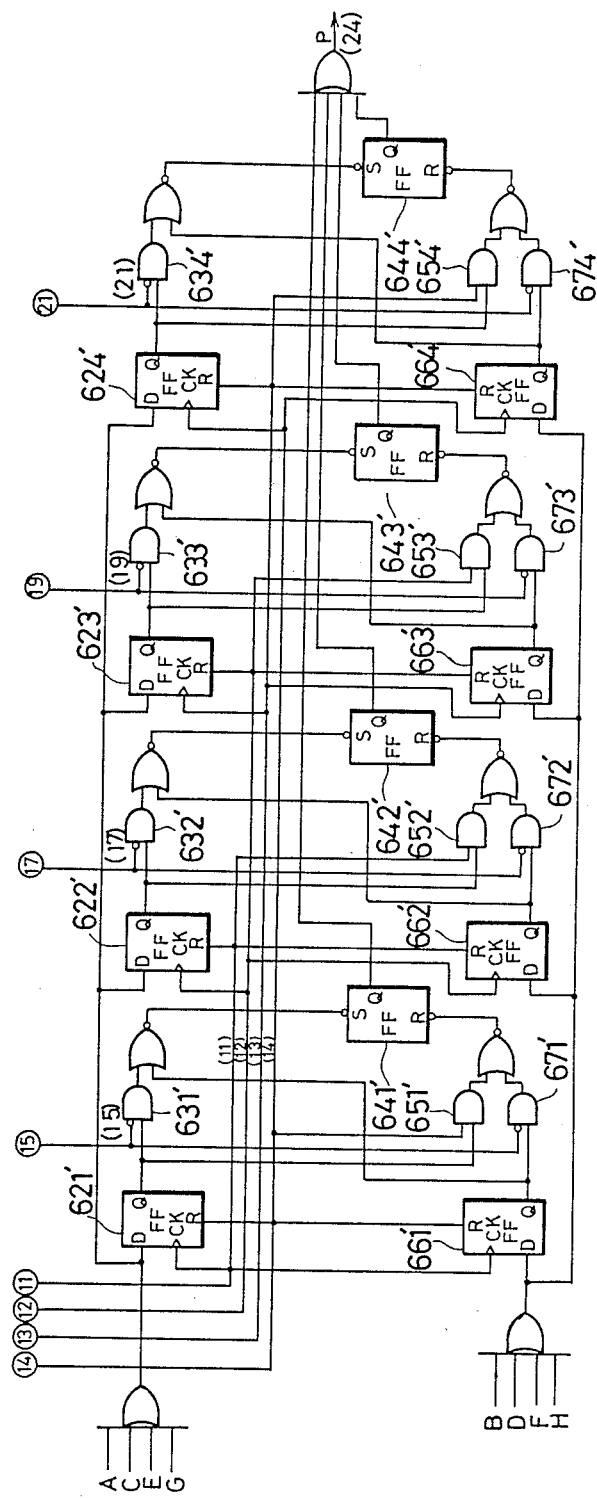
Figure 22A:
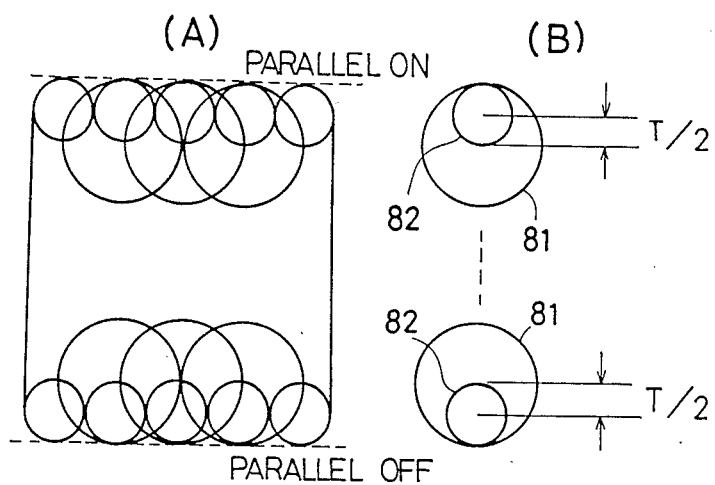
FIGS. 22A to 22D are explanatory diagrams of exposure timing corrections.
Figure 22B:
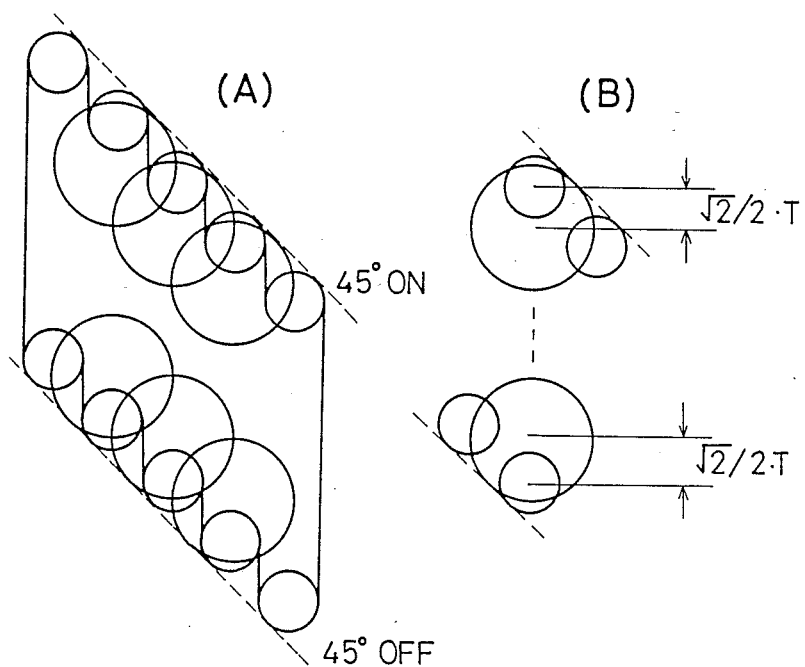
Figure 22C:
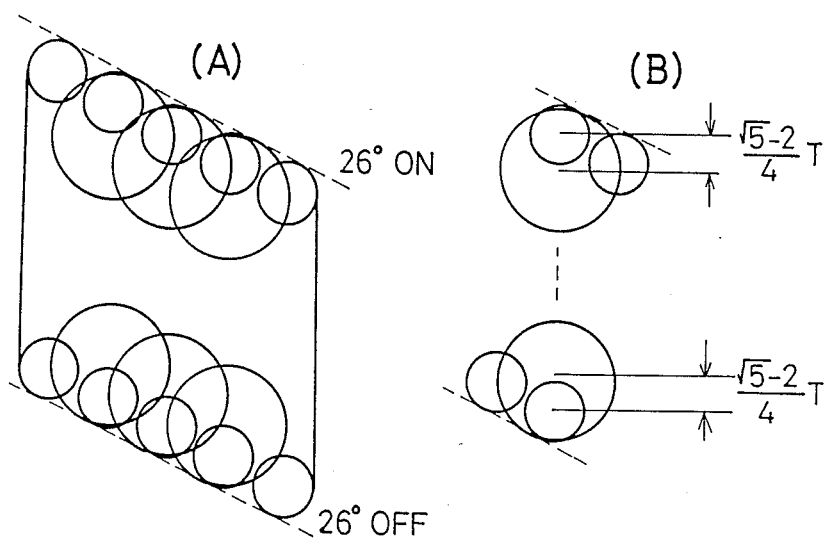
Figure 22D:
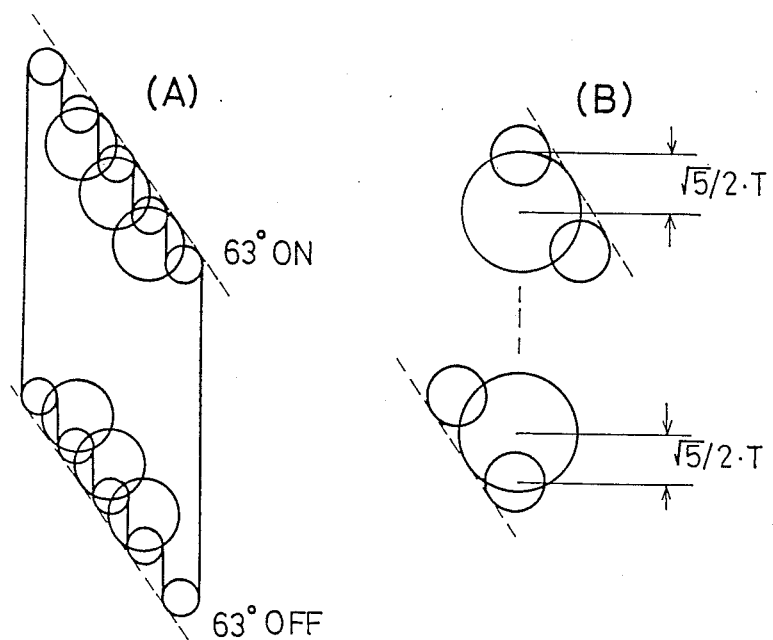

FIGS. 20A and 20B are circuit diagrams showing examples of configurations of the beam control signal producing part 37 in detail, and FIG. 21 is a timing chart showing the operations thereof. A decoder 601 determines preset values to be supplied to counters 611 to 614 in response to the aforementioned pattern deciding signals A to J. The preset values are adapted to correct exposure timings, and are varied with the respective patterns as shown in FIG. 18. Consider a case where, for example, the printing spot diameters in boundaries of parallel ON and OFF patterns are doubled as shown at (A) in FIG. 22A(B). In this case, it is necessary to correct the exposure beams of a doubled printing spot diameter 81 in timing by ±T/2 in comparison with those of a normal printing spot diameter 82 to be radiated. Symbol T indicates a one-pixel clock interval, and an interval required for correcting the timing is varied with the ratio of the printing spot diameter 81 to 82. FIGS. 22B to 22D are explanatory diagrams similar to FIG. 22A, respectively showing ON/OFF patterns of 45°, 26° and 63°. It is understood from these drawings that an interval required for correcting the timing is $\pm(\sqrt{2}/2) \cdot T$ with respect to the 45° ON/OFF patterns and that required for correcting the timing is $\pm((\sqrt{5}-2)/4) \cdot T$ with respect to the 26° ON/OFF patterns while the interval required for correcting the timing is $\pm(\sqrt{5}/2) \cdot T$ with respect to the 63° ON/OFF patterns.

Considering that there may be minus timing corrections, a reference preset value (preset value in case of no timing correction) is selected at, e.g., 2T. Input/output ralations of the decoder 601 in this case are as follows:

| | |
|---|---|
| A (parallel ON) | $2T + (\frac{1}{2})T$ |
| B (parallel OFF) | $2T - (\frac{1}{2})T$ |
| C (45° ON) | $2T + (\sqrt{2}/2) \cdot T$ |
| D (45° OFF) | $2T - (\sqrt{2}/2) \cdot T$ |
| E (26° ON) | $2T + ((\sqrt{5}-2)/4) \cdot T$ |
| F (26° OFF) | $2T - ((\sqrt{5}-2)/4) \cdot T$ |
| G (63° ON) | $2T + (\sqrt{6}/2) \cdot T$ |
| H (63° OFF) | $2T - (\sqrt{6}/2) \cdot T$ |
| I (normal ON) | 2T |
| J (normal OFF) | no output |

A frequency-dividing counter 602 divides the encoder clocks (2) from the rotary encoder 34 as shown in FIG. 15, thereby to output four-phase clocks (11) to (14), the phases of which deviate by one pixel clock. Counters 611 to 614 receive the four-phase clocks (11) to (14) respectively as load signals, thereby to load the aforementioned preset value outputted from the decoder 601 at that time. A PLL circuit 603 outputs multiplication clocks obtained by multiplying the encoder clocks (2), and the counters 611 to 614 downcount the aforementioned preset value in synchronization with the multiplication clocks.

It is assumed here that contents of data of noted pixel (central pixels of 3×3 pixel regions to be outputted) read along address signals in FIG. 21 are ON (i.e., printing) in intervals $T_0$ to $T_2$ and $T_5$ to $T_7$, as shown at (10), while printed portions in the intervals $T_0$ to $T_2$ start in 45° ON patterns and end in 63° OFF patterns and printed portions in the intervals $T_5$ to $T_7$ start in 26° ON patterns and end in 45° OFF paterns. At this time, a first four-phase clock (11) in the interval $T_0$ loads $2T + \sqrt{2}/2 \cdot T$ in the counter 611 while a signal C (45° ON pattern detecting signal) is latched by a flip-flop 621, whereby AND gates 631 and 651 enter high-level states. After a lapse of $2T + \sqrt{2}/2 \cdot T$, the counter 611 outputs a borrow pulse (15), which in turn sets a flip-flop 641 through the AND gate 631, so that an output signal (16) of the flip-flop 641 is turned to a high level. After a lapse of three pixel clocks, i.e., in starting of the interval $T_3$, the four-phase clock (14) is outputted to reset the flip-flop 621 as well as to reset the flip-flop 641 through the AND gate 651. Therefore, at this time, the AND gates 631 and 651 are turned to low levels and the output signal (16) from the flip-flop 641 is turned to a low level.

With the first four-phase clocks (12) and (13) in the intervals $T_1$ and $T_2$, the normal ON patterns are detected, whereby 2T is loaded in the counters 612 and 613 by the said four-phase clocks, so that the output signal (18) of a flip-flop 642 is turned to a high level in the interval $T_3$ and the output signal (20) of a flip-flop 643 is turned to a high level in the interval $T_4$.

Then, a first four-phase clock (14) in the interval $T_3$ loads $2T - \sqrt{6}/2 \cdot T$ in the counter 614 while a signal H (63° OFF pattern detecting signal) is latched by a flip-flop 664, whereby a flip-flop 644 is immediately set by the latched output so that its output signal (22) is turned to a high level and an AND gate 674 is turned to a high level. After a lapse of $2T - \sqrt{6}/2 \cdot T$, the counter 614 outputs a borrow pulse (21), which in turn resets the flip-flop 644 through the AND gate 674, so that an output signal (22) of the flip-flop 644 is turned to a low level. After a lapse of three pixel clocks, i.e., in starting of the interval $T_6$, the flip-flop 664 is reset by the four-phase clock (13), so that the AND gate 674 is turned to a low level.

When the normal OFF patterns are detected as in the intervals $T_3$ to $T_4$ of the data (10), the pattern detecting signals J thereof are not supplied to data input terminals D of the flip-flops 661 to 664 working on OFF pattern detecting signals, and thus the flip-flops 641 to 644 are not set at this time while the output signals thereof are maintained at low levels.

Thereafter in correspondence to the ON intervals $T_5$ to $T_7$ of the data (10), the output signal (18) of the flip-flop 642 is turned to a high level partially in the interval $T_7$ and the output signal (20) of the flip-flop 643 is turned to a high level in the interval $T_8$ while the output signal (22) of the flip-flop 644 is turned to a high level in the interval $T_9$ and the output signal (16) of the flip-flop 641 is turned to a high level in the interval $T_8$ and partially in the interval $T_9$, in a similar operation to the above. The output signals (16), (18), (20) and (22) of the flip-flops 641 to 644 thus obtained are ORed thereby to obtain beam ON/OFF control signals Q as shown at (23).

FIG. 20B shows the configuration for obtaining the spot diameter control signals P, which configuration is similar to that in FIG. 20A except that no normal ON pattern detecting signal I is inputted in data input terminals D of flip-flops 621' to 624'. Therefore, output signals from the flip-flops 641' to 644' are obtained by removing those corresponding to the normal ON pattern detecting signals I (interval $T_3$ of output signals (18), interval $T_4$ of output signals (20), interval $T_8$ of output signals (20) and interval $T_9$ of output signals (22)) from the high-level output signals of the flip-flops 641 to 644. Thus, the spot diameter control signals P with respect to the data (10) are as shown at (24).

Figure 23:
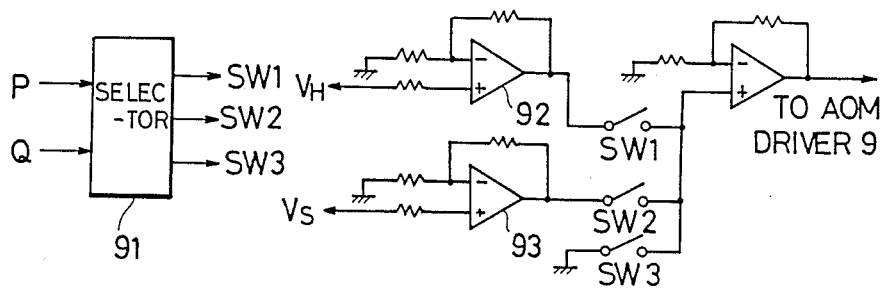
FIG. 23 is a circuit diagram showing an AOM control part in detail.

FIG. 23 is a circuit diagram showing the AOM control part 38 in detail. A selector 91 selects switches SW1 to SW3 by the said spot diameter control signals P and beam ON/OFF control signals Q on the basis of the following Table:

| P | Q | SW Selection |
|---|---|---|
| high | high | SW1 - ON |
| low | high | SW2 - ON |
| low | low | SW3 - ON |
| high | low | SW3 - ON |

When the switch SW1 is ON, voltage $V_H$ higher than the normal (standard) voltage level $V_S$ is supplied through an amplifier 92 to an AOM driver 39, whereby the beams controlled by the AOM 40 are increased in power and the diameters of the printing spots defined by the exposure beams are increased. When the switch SW2 is ON, the normal (standard) voltage $V_S$ is supplied through an amplifier 93 to the AOM driver 39, whereby the beams are normalized in power and the printing spot diameters are normalized. When the switch SW3 is ON, the voltage is zeroed and the beams are turned off. Thus, in the case of the data (10), input signals of the AOM driver 39 are as shown at (26), and the beam loci are finally traced as shown at (25).

When large pattern inclinations are to be formed with respect to the vertical scanning direction as shown in FIGS. 22B and 22D, the boundaries may still be irregular even if the patterns are formed in the aforementioned method. Description is now made of a method of smoothly printing the patterns.

Figure 24A:
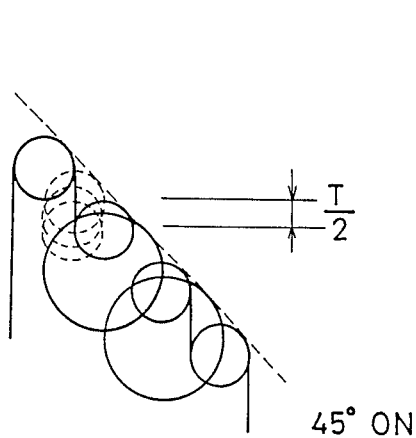
FIGS. 24A and 24B are explanatory diagrams showing such case where locations of exposure beams are moved by desired periods in addition to exposure timing corrections.

FIG. 24A shows an improvement applied to FIG. 22B, in which lines other than the second scanning line from the left end are exposed as hereinabove described in pattern formation. With respect to the second line from the left end, the exposure beams are turned on faster in timing by T/2 than the said timing while the signals applied to the AOM are changed in frequency to control the deflection angle by the interval T/2 so that the center of the exposure beams is located at the center between the left end and the second line from the left end. The exposure is so performed that the exposure beams trace loci as shown by dotted lines in FIG. 24A. Thereafter the exposure is performed in the aforementioned manner, whereby the unevenness in the boundaries is further reduced.

Figure 24B:
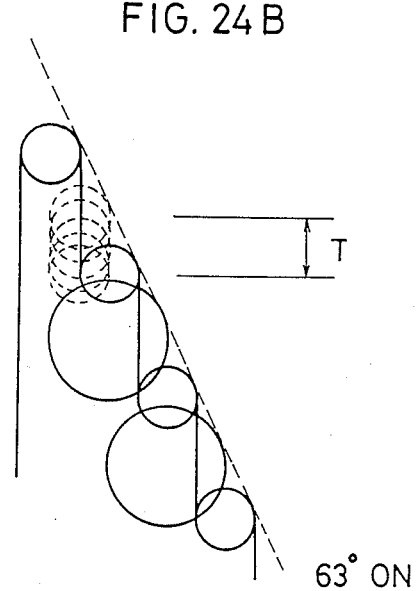

FIG. 24B shows an improvement applied to FIG. 22D, and the exposure is performed in the aforementioned manner except for the second scanning line from the left end in pattern formation. With respect to the second scanning line from the left end, exposure beams are turned on faster in timing by an interval T than the aforementioned timing while signals to be applied to an AOM are changed in frequency to control the deflection angle by the interval T so that the center of the exposure beams is located at the center between the left end and the second line from the left end. The exposure is so performed that the exposure beams trace loci as shown by dotted lines in FIG. 24B. Thereafter the exposure is performed in the aforementioned manner, whereby the unevenness in the boundaries is further reduced.

The aforementioned examples have been described with respect to application to ON areas of pattern formation, though such improving means can also be applied to OFF areas of pattern formation.

The pattern decision, control of the printing spot diameters and control of the exposure timings in the above description can be performed in a software manner through a computer, and the printing spot diameters can also be optically changed through a zoom lens etc. without changing the beam power.

Although the above description has been made for printing by single beams, the aforementioned control circuit may be provided for each channel in order to apply the second embodiment of the present invention to printing by multiple beams.

According to the second embodiment as hereinabove described, the tilt angles of the pattern boundaries intersecting with the main scanning direction are detected to increase the printing spot diameters in response to the detected angles, whereby the pattern boundaries intersecting with the main scanning direction can be smoothly printed for performing exposure/recording in the raster scanning system particularly effectively in printing of PWB patterns, while improving size accuracy of the printed PWB patterns. Further, edges of characters, images and the like can be improved in quality and size accuracy in a precise exposure apparatus for photomechanical process etc.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of controlling exposure beams for printing/recording desired images on photosensitive material by performing main scanning and vertical scanning while on-off controlling said exposure beams, said method comprising the steps of:
   detecting vertical scanning direction feed pitch errors of said exposure beams; and
   changing diameters of printing spots, defined on said photosensitive material by said exposure beams, on the basis of said detected feed pitch errors thereby to correctly orient edges of traces formed by said printing spots along the main scanning direction.

2. A method of controlling exposure beams in accordance with claim 1, wherein said exposure beams are multiple beams, wherein said step of changing diameters comprises the step of changing diameters of printing spots on opposite edges of a line traced by said multiple beams in opposite directions in response to changes in values of said feed pitch errors.

3. A method of controlling exposure beams in accordance with claim 1, wherein said exposure beams are multiple beams, wherein said step of changing diameters comprises the step of changing diameters of respective ones of said printing spots, defined by odd-numbered beams and even-numbered respective beams, in opposite directions in response to changes in values of said feed pitch errors.

4. A device for controlling exposure beams for printing/recording desired images on phototsensitive material by performing scanning in main and vertical scanning directions while on-off controlling said exposure beams, said device comprising:
   feed pitch error detecting means for detecting vertical scanning direction feed pitch errors of said exposure beams; and
   printing spot diameter change means for changing diameters of printing spots, defined on said photosensitive material by said exposure beams, on the basis of said detected feed pitch errors, thereby to correctly orient edges of traces formed by said printing spots along the main scanning direction.

5. A device for controlling exposure beams in accordance with claim 4, wherein said exposure beams are multiple beams, said printing spot diameter change means including means for controlling changes of said diameters of said printing spots on opposite edges of a line traced by said multiple beams in opposite directions in response to changes in values of said feed pitch errors.

6. A device for controlling exposure beams in accordance with claim 4, wherein said exposure beams are multiple beams, said printing spot diameter change means including means for controlling changes of diameters of respective ones of said printing spots, defined by odd-numbered beams and even-numbered respective beams, in opposite directions in response to changes in values of said feed pitch errors.

7. A method of controlling exposure beams for printing/recording desired images on photosensitive material by performing scanning in main and vertical scanning directions while on-off controlling said exposure beams in accordance with supplied image data, said method comprising the steps of:
  detecting tilt angles of image boundaries of said image data relative to the main scanning direction; and
  controlling said exposure beams at least within said boundaries to increase diameters of printing spots, defined on said photosensitive material by said exposure beams, on the basis of said detected tilt angles, wherein said exposure beams are multiple beams, diameters of printing spots being controlled for spots defined by beams other than those on opposite edges of a line traced by said multiple beams.

8. A device for controlling multiple exposure beams for printing/recording desired images on photosensitive material by performing scanning in main and vertical scanning directions while on-off controlling said exposure beams in accordance with supplied image data, said device comprising:
  tilt angle detecting means for detecting tilt angles of image boundaries of said image data relative to the main scanning direction; and
  exposure beam control means for controlling said exposure beams at least within said boundaries to increase diameters of printing spots, defined on said photosensitive material by said exposure beams, on the basis of said detected tilt angles,
  said exposure beam control means including means for controlling diameters of printing spots defined by beams other than those on opposite edges of a line traced by said multiple beams.

9. A device for controlling exposure beams in accordance with claim 8, wherein said exposure beam control means includes means for controlling timings for increasing said diameters of said printing spots thereby accurately to define correct image boundaries.

10. A device for controlling exposure beams in accordance with claim 8, further including means for moving positions of said exposure beams by prescribed amounts in the vertical scanning direction and by intervals in the horizontal directions corresponding to said detected tilt angles, in advance of an increase of said diameters of said printing spots by said exposure beam control means.

* * * * *